US012561123B2

(12) United States Patent
     Ishikawa et al.

(10) Patent No.: US 12,561,123 B2
(45) Date of Patent: Feb. 24, 2026

(54) CENTER, METHOD, AND NON-TRANSITORY STORAGE MEDIUM

(71) Applicant: TOYOTA JIDOSHA KABUSHIKI KAISHA, Toyota (JP)

(72) Inventors: Tomoyasu Ishikawa, Nagoya (JP); Shunsuke Tanimori, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 107 days.

(21) Appl. No.: 17/806,181

(22) Filed: Jun. 9, 2022

(65) Prior Publication Data

US 2023/0032451 A1      Feb. 2, 2023

(30) Foreign Application Priority Data

Jul. 28, 2021     (JP) ................................. 2021-123510

(51) Int. Cl.
     *G06F 8/65*          (2018.01)
     *H04W 4/44*          (2018.01)
     *H04W 76/19*         (2018.01)

(52) U.S. Cl.
     CPC ................ *G06F 8/65* (2013.01); *H04W 4/44* (2018.02); *H04W 76/19* (2018.02)

(58) Field of Classification Search
     CPC ........................................................ G06F 8/65
     USPC ........................................................ 717/168
     See application file for complete search history.

(56) References Cited

U.S. PATENT DOCUMENTS 8,730,033 B2 * 5/2014 Yarnold .................. H04W 8/18
                                                         340/901

| | | | | |
|---|---|---|---|---|
| 8,813,061 | B2 * | 8/2014 | Hoffman | G06F 8/65 |
| | | | | 717/172 |
| 9,116,786 | B2 * | 8/2015 | Ricci | H04L 12/6418 |
| 9,772,839 | B2 * | 9/2017 | Hong | H04L 67/12 |
| 10,394,548 | B2 * | 8/2019 | Fox | G06F 11/1433 |
| 10,489,141 | B2 * | 11/2019 | Nakamura | H04L 12/40 |
| 10,917,763 | B2 * | 2/2021 | Klatt | G07B 15/063 |
| 11,137,997 | B2 * | 10/2021 | Fox | G06F 16/188 |
| 11,429,377 | B2 * | 8/2022 | Mezaael | G06F 8/658 |
| 11,960,877 | B2 * | 4/2024 | Ishikawa | H04L 67/34 |

(Continued)

FOREIGN PATENT DOCUMENTS

| CN | 111930403 A | * | 11/2020 | |
|---|---|---|---|---|
| CN | 116710917 A | * | 9/2023 | H04L 9/3236 |

(Continued)

OTHER PUBLICATIONS

NPL—Text English Translation for Foreign Patent Documents.*
NPL—English Text Translation for WO-2020032044-A1 (Image and Text).*

*Primary Examiner* — Francisco J Aponte

(74) *Attorney, Agent, or Firm* — Oblon, McClelland, Maier & Neustadt, L.L.P.

(57) ABSTRACT

A center includes one or more processors configured to: execute communication between a vehicle and an information terminal associated with the vehicle; determine a communication state between the vehicle and the information terminal; control software update processing of an electronic control unit mounted on the vehicle based on an update approval notification received from the information terminal; and restrict the software update processing when the communication between the vehicle and the information terminal is being interrupted.

8 Claims, 9 Drawing Sheets

(56) References Cited

U.S. PATENT DOCUMENTS

| | | | |
|---|---|---|---|
| 2014/0068596 A1* | 3/2014 | Mota | G06F 8/65 |
| | | | 717/173 |
| 2015/0230044 A1* | 8/2015 | Paun | H04L 67/12 |
| | | | 455/41.2 |
| 2016/0266886 A1* | 9/2016 | Sarkar | H04W 4/50 |
| 2018/0107473 A1* | 4/2018 | Ahmed | G06F 8/654 |
| 2018/0307477 A1* | 10/2018 | Hong | H04L 67/12 |
| 2019/0034256 A1* | 1/2019 | Fox | G06F 11/1629 |
| 2019/0102159 A1* | 4/2019 | Gur | H04L 67/34 |
| 2019/0243632 A1* | 8/2019 | Hong | H04L 67/06 |
| 2020/0050442 A1* | 2/2020 | Sakurai | H04W 4/48 |
| 2020/0174779 A1* | 6/2020 | David | G06F 8/654 |
| 2020/0183676 A1* | 6/2020 | Sakurai | H04L 67/34 |
| 2021/0136542 A1 | 5/2021 | Ariga et al. | |
| 2021/0155252 A1* | 5/2021 | Harata | G06F 11/1433 |
| 2021/0167988 A1* | 6/2021 | Harata | H04W 4/40 |
| 2021/0219114 A1* | 7/2021 | Otaka | H04W 4/48 |
| 2021/0255805 A1* | 8/2021 | Harata | H04L 12/403 |
| 2021/0397444 A1* | 12/2021 | Fox | B60W 50/0225 |
| 2021/0403016 A1* | 12/2021 | Jung | G06F 8/65 |
| 2022/0012043 A1* | 1/2022 | Sakurai | H04L 9/3239 |
| 2022/0036670 A1* | 2/2022 | Kobayashi | G07C 5/0808 |
| 2022/0179641 A1* | 6/2022 | Harata | B60R 16/02 |
| 2022/0326931 A1* | 10/2022 | Choi | B60W 50/14 |

FOREIGN PATENT DOCUMENTS

| | | | | |
|---|---|---|---|---|
| JP | 2015041334 A | * | 3/2015 | |
| JP | 2017-149323 A | | 8/2017 | |
| JP | 2021-76972 A | | 5/2021 | |
| JP | 2021128362 A | * | 9/2021 | |
| JP | 102023112746 A1 | * | 12/2023 | |
| WO | WO-2020032044 A1 | * | 2/2020 | B60R 16/02 |

* cited by examiner

FIG. 7

| ECU ID | MEMORY TYPE |
|--------|-------------|
| aaaa | SECOND TYPE (DUAL-BANK) |
| bbbb | SECOND TYPE (DUAL-BANK) |
| cccc | FIRST TYPE (SINGLE-BANK) |
| dddd | FIRST TYPE (SINGLE-BANK) |
| ... | ... |

CENTER, METHOD, AND NON-TRANSITORY STORAGE MEDIUM

CROSS-REFERENCE TO RELATED APPLICATION

This application claims priority to Japanese Patent Application No. 2021-123510 filed on Jul. 28, 2021, incorporated herein by reference in its entirety.

BACKGROUND

1. Technical Field

The present disclosure relates to a center, a method executed by the center, and a non-transitory storage medium.

2. Description of Related Art

A plurality of electronic control units (ECUs) used for controlling an operation of a vehicle is mounted on the vehicle. The ECU includes a processor, a transitory storage unit, such as a random access memory (RAM), and a non-volatile memory which is a non-volatile storage unit, such as a flash read-only memory (ROM). A control function of the ECU is implemented when the processor executes software stored in the non-volatile memory. Software stored in each ECU is rewritable, and by updating to a newer version of the software, it is possible to improve a function of each ECU or add a new vehicle control function.

An over-the-air (OTA) technology is known as an example of a technology for updating software of an ECU. In the OTA technology, a device that wirelessly connects an in-vehicle communication device connected to an in-vehicle network to a communication network, such as the Internet, and executes software update processing of the vehicle updates or adds the software of the ECU by executing download of software from a server via wireless communication, installation for writing the downloaded software on the ECU, and activation for making the installed software active (see, for example, Japanese Unexamined Patent Application Publication No. 2017-149323.)

SUMMARY

When a software update using an OTA is executed, processing, such as sending a notification indicating that there is a software update or an approval request for the software update to a user, a manager, or the like of a vehicle, is executed. This notification, approval request, or the like is sent to the user, the manager, or the like of the vehicle via an information terminal, such as a car navigation device mounted on the vehicle or a smartphone that can wirelessly communicate with the vehicle.

A portable information terminal, such as a smartphone, may move away from the vehicle and then may not be cooperating with the vehicle, after approving the software update in a situation where the information terminal is cooperating with the vehicle. However, under current software update control, once the software update is approved, the software update processing for the vehicle is continuously executed even when the information terminal that has approved the software update is not cooperating with the vehicle after the approval. Therefore, there is room for further improvement in controlling the software update processing.

The present disclosure provides a center, a method, and a non-transitory storage medium that can appropriately control software update processing of an electronic control unit mounted on a vehicle.

A center according to a first aspect of the present disclosure includes one or more processors configured to: execute communication between a vehicle and an information terminal associated with the vehicle; determine a communication state between the vehicle and the information terminal; control software update processing of an electronic control unit mounted on the vehicle based on an update approval notification received from the information terminal; and restrict the software update processing when the communication between the vehicle and the information terminal is being interrupted.

A method according to a second aspect of the present disclosure is executed by a center including one or more processors and one or more memories. The method includes: executing communication between a vehicle and an information terminal associated with the vehicle; determining a communication state between the vehicle and the information terminal; controlling, software update processing of an electronic control unit mounted on the vehicle based on an update approval notification received from the information terminal; and restricting the software update processing when the communication between the vehicle and the information terminal is being interrupted.

A non-transitory storage medium according to a third aspect of the present disclosure stores instructions that are executable by a computer of a center which includes one or more processors and one or more memories, and that cause the computer to execute functions including: executing communication between a vehicle and an information terminal associated with the vehicle; determining a communication state between the vehicle and the information terminal; controlling, software update processing of an electronic control unit mounted on the vehicle based on an update approval notification received from the information terminal; and restricting the software update processing when the communication between the vehicle and the information terminal is being interrupted.

With each aspect of the present disclosure, it is possible to appropriately control software update processing of an electronic control unit mounted on a vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 7 is a diagram illustrating an example of type information;

DETAILED DESCRIPTION OF EMBODIMENTS

A center according to the present disclosure adds a restriction required for software update processing further based on a cooperation state between an information terminal and a vehicle when a software update for an electronic control unit (ECU) mounted on the vehicle has been approved by an information terminal outside the vehicle. As such, completion of the software update processing of the ECU is implemented safely and in a short time. Hereinafter, one embodiment of the present disclosure will be described in detail with reference to drawings.

EMBODIMENTS

System Configuration

Figure 1:
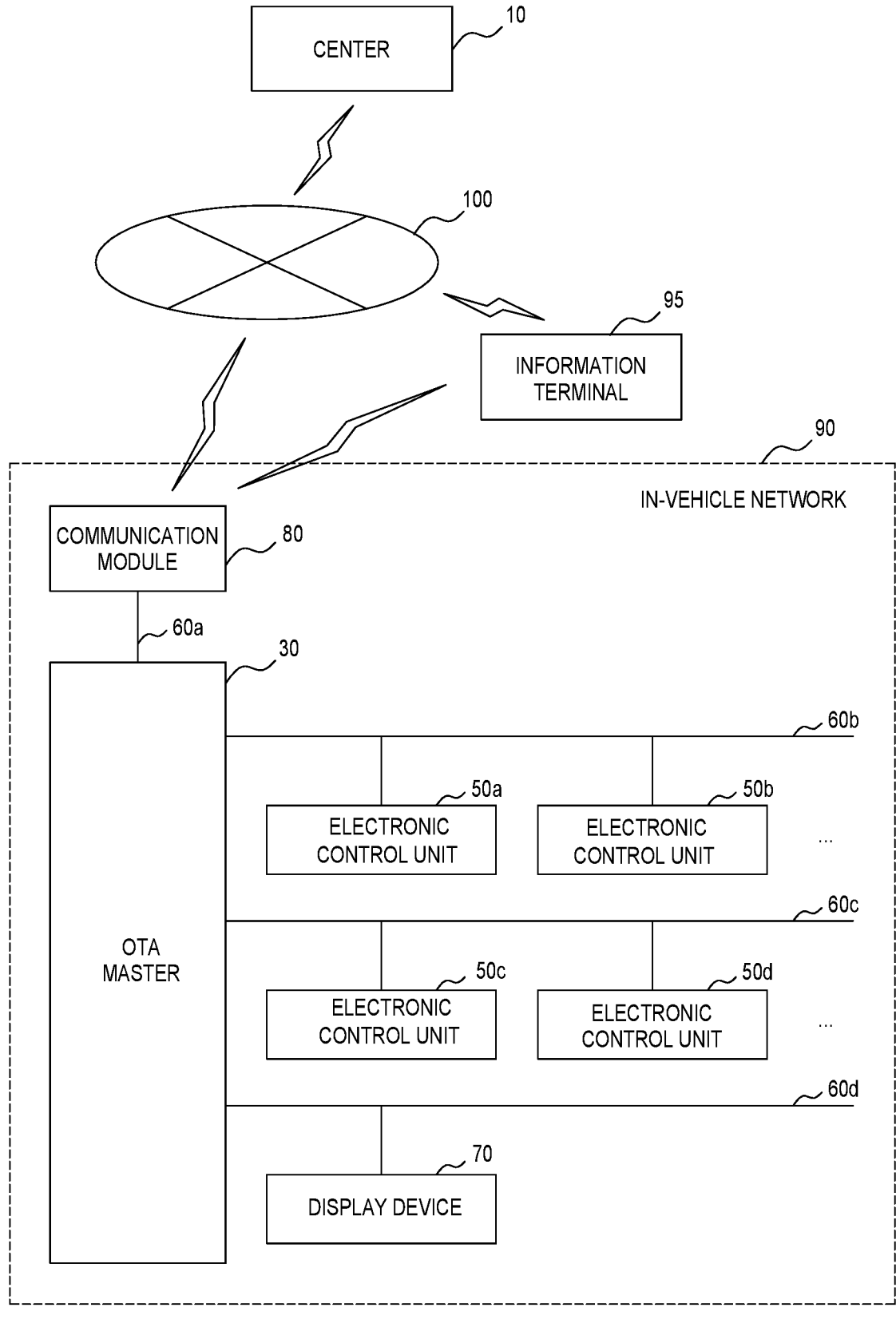
FIG. 1 is a block diagram illustrating an overall configuration of a network system according to an embodiment.

FIG. 1 is a block diagram illustrating an overall configuration of a network system according to one embodiment of the present disclosure. The network system illustrated in FIG. 1 is used for updating software of a plurality of ECUs 50a to 50d mounted on the vehicle, and includes a center 10 outside the vehicle, an in-vehicle network 90 constructed inside the vehicle, and an information terminal 95 associated with the vehicle.

(1) Center

The center 10 can communicate with an OTA master 30 (described below) included in the in-vehicle network 90 via a network 100, and can control and manage updates of the software of the ECUs 50a to 50d connected to the OTA master 30 by transmitting the update data of the software of the ECUs 50a to 50d and information defining update processing procedures, and receiving a notification indicating progress of the software update processing, or the like. The center 10 functions as a so-called server. Further, the center 10 can communicate with the information terminal 95 via the network 100, and send a notification indicating that there are software updates for the ECUs 50a to 50d or an approval request for the software update to a user, a manager, or the like of the vehicle.

Figure 2:
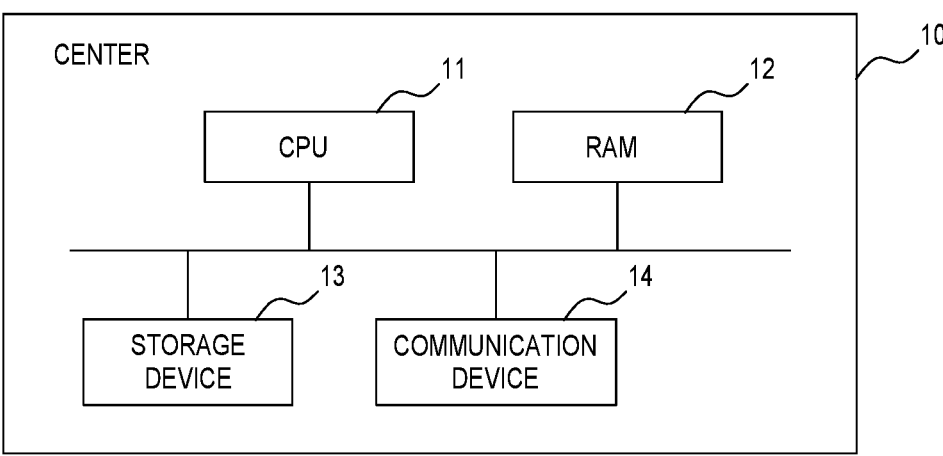
FIG. 2 is a block diagram illustrating a schematic configuration of a center.

FIG. 2 is a block diagram illustrating a schematic configuration of the center 10 in FIG. 1. As illustrated in FIG. 2, the center 10 includes a central processing unit (CPU) 11, a random access memory (RAM) 12, a storage device 13, and a communication device 14. Each of the numbers of the CPU 11, RAM 12, the storage device 13, and the communication device 14 is not limited to one, and may be plural. The storage device 13 includes a readable and writable storage medium, such as a hard disk drive (HDD) or a solid state drive (SSD), and stores a program used for executing software update management, information used for software update control and software update management, the update data of software of each ECU, and the like. In the center 10, the CPU 11 executes predetermined processing for the software update by executing a program read from the storage device 13 using the RAM 12 as a work area. The communication device 14 is used for communicating with the OTA master 30 or the information terminal 95 via the network 100.

Figure 3:
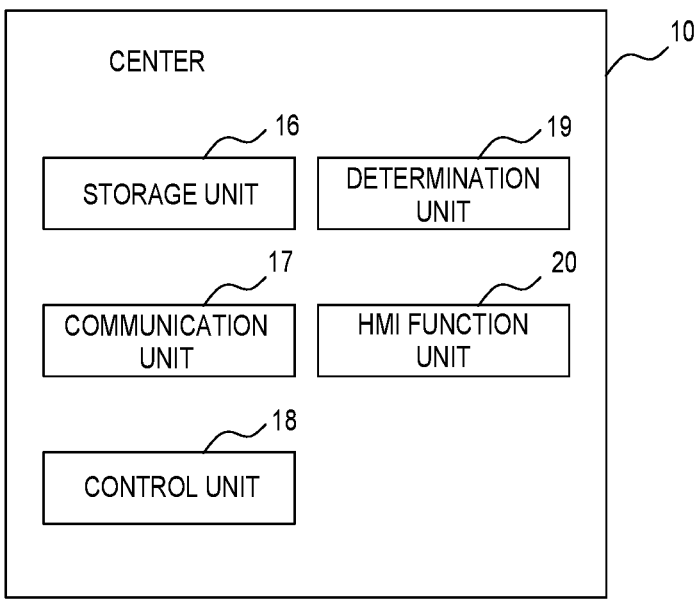
FIG. 3 is a functional block diagram of the center.

FIG. 3 is a functional block diagram of the center 10 illustrated in FIG. 2. The center 10 illustrated in FIG. 3 includes a storage unit 16, a communication unit 17, a control unit 18, a determination unit 19, and an HMI function unit 20. A function of the storage unit 16 is implemented by the storage device 13 illustrated in FIG. 2. Functions of the communication unit 17, the control unit 18, the determination unit 19, and the HMI function unit 20 are implemented when the CPU 11 illustrated in FIG. 2 executes a program stored in the storage device 13 using the RAM 12.

The storage unit 16 stores information on the software update processing of one or more ECUs mounted on the vehicle. As the information on the software update processing, the storage unit 16 at least stores update management information in which information indicating software that can be used in the ECUs 50a to 50d is associated with each piece of vehicle identification information (a vehicle ID) for identifying a vehicle, and the update data of the software of the ECUs 50a to 50d. As the information indicating the software that can be used in the ECUs 50a to 50d, for example, a combination of latest version information of each piece of software of the ECUs 50a to 50d is defined. As the information on the software update processing, the storage unit 16 can store an update status indicating a software update state executed in the vehicle. Further, as the information on the software update processing, the storage unit 16 can store information on an update sequence indicating software update processing procedures, which is used for giving a control instruction to the OTA master 30.

The communication unit 17 functions as a transmission unit and receiving unit that transmits and receives data, information, notifications, requests, and the like, to and from the OTA master 30 or to and from the information terminal 95. The communication unit 17 receives an update confirmation request of the software from the OTA master 30 (the receiving unit). The update confirmation request may be, for example, information transmitted from the OTA master 30 to the center 10 at a time when a power supply or an ignition is turned on (hereinafter, referred to as "power supply ON") in the vehicle, and is information for requesting the center 10 to confirm whether there is the update data for the ECUs 50a to 50d based on vehicle configuration information described below. Further, the communication unit 17 transmits information indicating whether there is the update data to the OTA master 30 in response to the update confirmation request received from the OTA master 30 (the transmission unit). Further, the communication unit 17 receives a transmission request (a download request) for the distribution package from the OTA master 30 (the receiving unit). Further, upon receiving the download request for the distribution package (the receiving unit), the communication unit 17 transmits, to the OTA master 30, a distribution package including the update data of the software of the ECUs 50a to 50d generated by the control unit 18 described below and the like (the transmission unit). Further, based on an instruction of the HMI function unit 20, the communication unit 17 can send, to the OTA master 30 or the information terminal 95, a notification indicating that there is a software update or an approval request for the software update for the user, the manager, or the like of the vehicle (the transmission unit). Further, the communication unit 17 can receive, from the OTA master 30 (or the information terminal 95), information on a communication state between the vehicle and the information terminal 95, that is, whether the vehicle and the information terminal 95 are in a cooperation state (hereinafter, referred to as "cooperation information") (the receiving unit). Further, the communication unit 17 can receive, from the OTA master 30 and/or the information terminal 95, a response (an update approval notification/an update disapproval notification) from the user, the manager, or the like of the vehicle to the approval request for the software update (the receiving unit).

When the communication unit 17 receives the update confirmation request from the OTA master 30, the control unit 18 determines, based on the update management information stored in the storage unit 16, whether there is the update data of the software of the ECUs 50a to 50d mounted on the vehicle specified by the vehicle ID, which is included in the update confirmation request. The determination result, by the control unit 18, of whether there is the update data is transmitted by the communication unit 17 to the OTA master 30. When the control unit 18 determines that there is the update data of the software of the ECUs 50a to 50d and the communication unit 17 receives the download request for the distribution package from the OTA master 30, the control unit 18 generates one or more distribution packages including the update data and the like stored in the storage unit 16. Further, the control unit 18 restricts the software update processing of the ECUs 50a to 50d as needed based on the instruction from the user, the manager, or the like of the vehicle on the approval request for the software update executed by the HMI function unit 20, and the cooperation state between the vehicle and the information terminal 95 determined by the determination unit 19.

The determination unit 19 determines whether the vehicle and the information terminal 95 are in the cooperation state based on the cooperation information between the vehicle and the information terminal 95 received by the communication unit 17 from the OTA master 30 (or the information terminal 95). In the present embodiment, when the vehicle and the information terminal 95 are in the cooperation state, it means that the OTA master 30 is communicably connected to the information terminal 95 by predetermined near-field wireless communication method. Further, when the vehicle and the information terminal 95 are not in the cooperation state, it means that the communication between the OTA master 30 and the information terminal 95 by the near-field wireless communication method is being interrupted.

The HMI function unit 20 executes, via the communication unit 17, processing for sending, for example, a notification indicating that there are software updates for the ECUs 50a to 50d mounted on the vehicle, an approval request for the software update, or an information notification, such as the software update state, to the information terminal 95, as needed.

The information terminal 95 is a communication device, such as a smartphone owned by the user or the manager of the vehicle. The information terminal 95 can be associated with the vehicle by being, for example, registered and managed in the vehicle, and functions as a human-machine interface (HMI) used for executing a specific operation on the vehicle (for example, a locking/unlocking operation of a vehicle door or a remote parking operation), a display of information, or the like. The number of information terminals 95 associated with the vehicle is not limited to one, and may be plural.

(2) In-Vehicle Network

The in-vehicle network 90 includes the OTA master 30, the ECUs 50a to 50d, a display device 70, and a communication module 80. The OTA master 30 is connected to the communication module 80 via a bus 60a, connected to the ECUs 50a, 50b via a bus 60b, and connected to the ECUs 50c, 50d via a bus 60c. The OTA master 30 is connected to the display device 70 via a bus 60d.

The OTA master 30 can communicate with the center 10 via the bus 60a and the communication module 80 by way of the network 100 in a wireless manner. Further, the OTA master 30 can communicate with the information terminal 95 via the bus 60a and the communication module 80 using a near-field wireless communication method. Further, the OTA master 30 can communicate with the ECUs 50a to 50d and the display device 70 via the buses 60b to 60d in a wired manner. The OTA master 30 has functions of managing an OTA state and executing the software update for an ECU to be updated (hereinafter, also referred to as a "target ECU") by controlling the update sequence, which is a flow of the software update processing. The OTA master 30 controls the software update for the target ECU from among the ECUs 50a to 50d based on the update data and the like that are acquired from the center 10, according to the presence/absence of a restriction on the update following the cooperation state between the vehicle and information terminal 95. The OTA master 30 may also be referred to as a central gateway (CGW).

Figure 4:
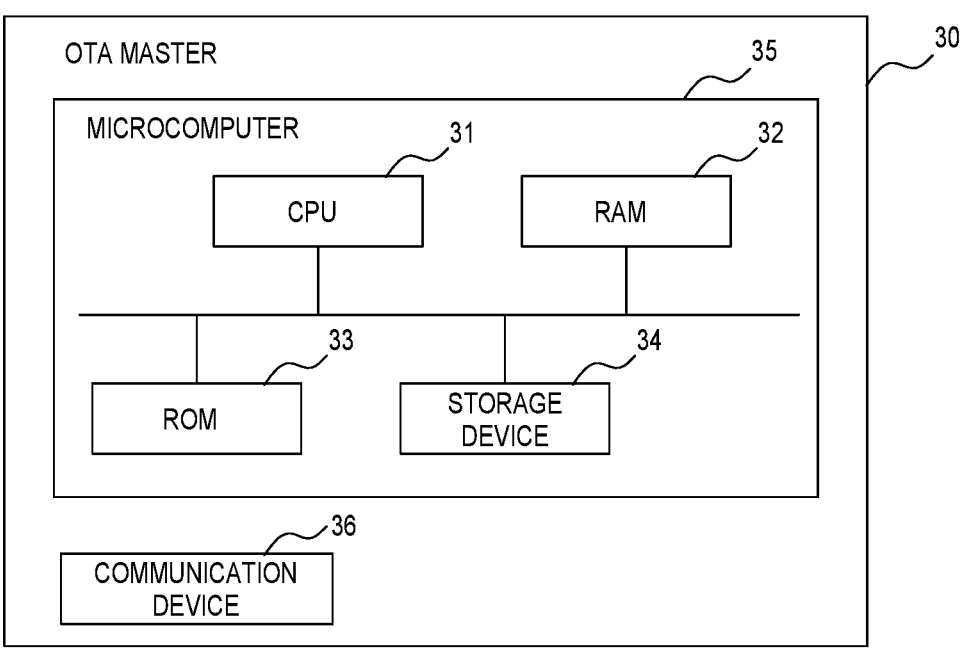
FIG. 4 is a block diagram illustrating a schematic configuration of an OTA master.

FIG. 4 is a block diagram illustrating a schematic configuration of the OTA master 30 in FIG. 1. As illustrated in FIG. 4, the OTA master 30 includes a CPU 31, a RAM 32, a read-only memory (ROM) 33, a storage device 34, and a communication device 36. The CPU 31, the RAM 32, the ROM 33, and the storage device 34 compose a microcomputer 35. The number of microcomputers 35 is not limited to one and may be plural. In the OTA master 30, the CPU 31 executes predetermined processing for the software update by executing a program read from the ROM 33 using the RAM 32 as a work area. The communication device 36 is used for communicating with each of the communication module 80, the ECUs 50a to 50d, and the display device 70 via the buses 60a to 60d illustrated in FIG. 1.

Figure 5:
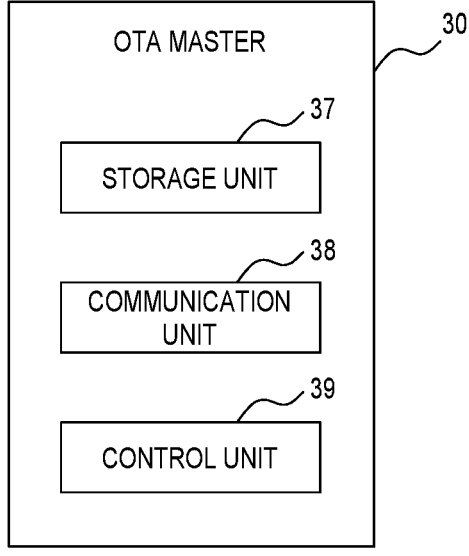
FIG. 5 is a functional block diagram of the OTA master.

FIG. 5 is a functional block diagram of the OTA master 30 illustrated in FIG. 4. The OTA master 30 illustrated in FIG. 5 includes a storage unit 37, a communication unit 38, and a control unit 39. A function of the storage unit 37 is implemented by the storage device 34 illustrated in FIG. 4. Functions of the communication unit 38 and the control unit 39 are implemented when the CPU 31 illustrated in FIG. 4 executes a program stored in the ROM 33 using the RAM 32.

In addition to a program (a control program of the OTA master 30) for updating the software of the ECUs 50a to 50d or various pieces of data used when updating the software, the storage unit 37 stores the software update data and the like that are downloaded from the center 10. Further, the storage unit 37 can store the information (described below) on the types of the non-volatile memories mounted on the ECUs 50a to 50d, respectively.

The communication unit 38 functions as a transmission unit and receiving unit that transmits and receives data, information, notifications, requests, and the like to and from the center 10 or to and from the information terminal 95. The communication unit 38 transmits the update confirmation request of the software to the center 10 at, for example, the time of power supply ON in the vehicle (the transmission unit). The update confirmation request includes, for example, a vehicle ID for identifying the vehicle and the information on the current versions of the software of the ECUs 50a to 50d connected to the in-vehicle network 90. The vehicle ID and the current versions of the software of the ECUs 50a to 50d are used for determining whether there is the update data of the software of the ECUs 50a to 50d by comparing them with the latest software version held by the center 10 for each vehicle ID. Further, as a response to the update confirmation request, the communication unit 38 receives, from the center 10, a notification indicating whether there is the update data (the receiving unit). When there is the update data of the software of the ECUs 50a to 50d, the communication unit 38 transmits, to the center 10, the download request for the distribution package including the software update data and the like (the transmission unit), and receives (downloads) the distribution package transmitted from the center 10 (the receiving unit). Further, the communication unit 38 transmits, to the center 10, the software update state transmitted by the ECUs 50a to 50d (the transmission unit). Further, based on an instruction of the control unit 39, the communication unit 38 can display the software update state on the display device 70 or send a notification on the software update state to the information terminal 95.

The control unit 39 determines whether there is the update data of the software of the ECUs 50a to 50d based on the response, received by the communication unit 38 from the center 10, to the update confirmation request. Further, the control unit 39 verifies authenticity of the update data received (downloaded) in the distribution package by the communication unit 38 from the center 10 and stored in the storage unit 37. Further, the control unit 39 controls the software update processing (the installation, the activation, and the like) of the ECUs 50a to 50d, using the update data downloaded from the center 10. Specifically, the control unit 39 transfers the downloaded update data to the target ECU and causes the target ECU to install the update software based on the update data. After the completion of the installation, the control unit 39 gives the target ECU an instruction on the activation for making the installed update software active. At a time of executing the software update processing, the control unit 39 executes the installation or the activation based on information on the restriction on the update processing based on the cooperation state between the vehicle and the information terminal 95 received from the center 10.

The ECUs 50a to 50d are devices used for controlling the operation of each part of the vehicle. FIG. 1 illustrates an example where the in-vehicle network 90 includes four ECUs 50a to 50d, but the number of ECUs is not particularly limited. Further, the number of buses connecting the ECUs 50a to 50d to the OTA master 30 is not particularly limited, either. Each of FIGS. 6A and 6B illustrates an example of a schematic configuration of the ECUs 50a to 50d.

Figure 6A:
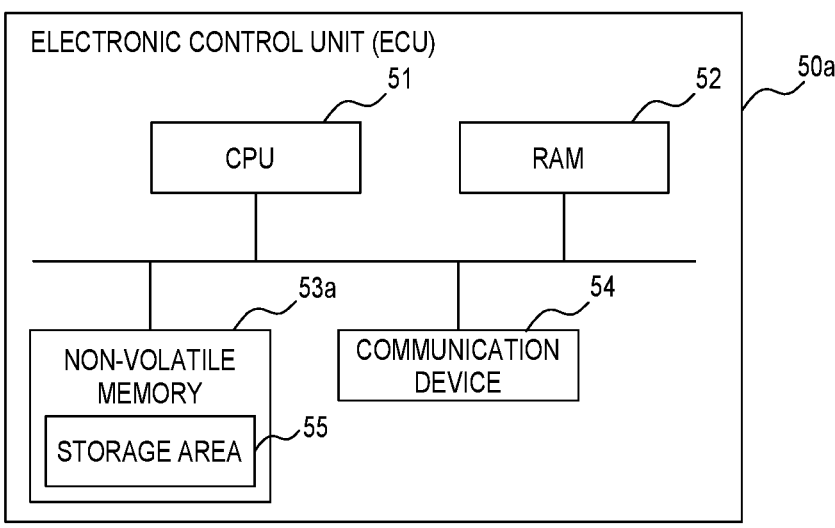
FIG. 6A is a block diagram illustrating an example of a schematic configuration of an electronic control unit.

The ECU 50a illustrated in FIG. 6A includes a CPU 51, a RAM 52, a non-volatile memory 53a, and a communication device 54. The CPU 51 implements a function of the ECU 50a by executing a program read from the non-volatile memory 53a using the RAM 52 as a work area. The non-volatile memory 53a is a memory (hereinafter, referred to as a "single-bank memory") having one storage area (a bank) 55 used for storing data, such as software. In the present embodiment, a memory type of the non-volatile memory 53a, which is a single-bank memory, may be stated as a "first type" to distinguish it from others. In addition to the software used for implementing the function of the ECU 50a, the storage area 55 may store version information, parameter data, a program for booting, a program for updating software, or the like. The communication device 54 is a device used for communicating with other ECUs 50b to 50d connected to the OTA master 30 or the in-vehicle network 90.

Figure 6B:
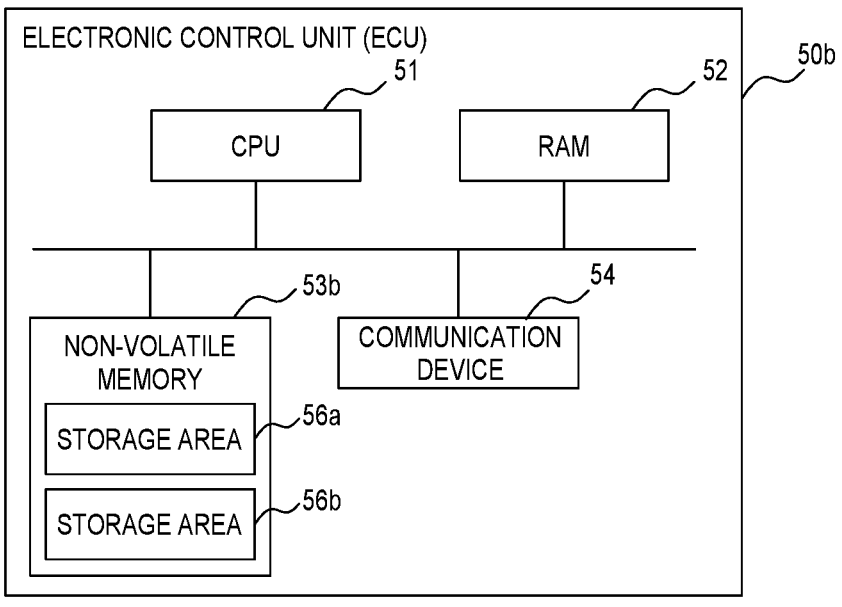
FIG. 6B is a block diagram illustrating another example of the schematic configuration of the electronic control unit.

Similar to the ECU 50a, the ECU 50b illustrated in FIG. 6B includes the CPU 51, the RAM 52, a non-volatile memory 53b, and the communication device 54. However, the non-volatile memory 53b mounted on the ECU 50b is a memory (hereinafter, referred to as a "dual-bank memory") having two storage areas (buses) 56a, 56b used for storing data, such as software. In the present embodiment, a memory type of the non-volatile memory 53b, which is a dual-bank memory, may be stated as a "second type" to distinguish it from others. In addition to the software used for implementing a function of the ECU 50b, the storage areas 56a, 56b may store version information, parameter data, a program for booting, a program for updating software, or the like. The CPU 51 of the ECU 50b uses any one of the two storage areas 56a, 56b included in the non-volatile memory 53b as the storage area (an active bank) to be read, and executes the software stored in the storage area to be read. On the other storage area (an inactive bank, a write bank) that is not to be read, the update software (an updated version program) can be installed (written) based on the update data in a background while the program in the storage area (the active bank) to be read is being executed. In the software update processing, at the time of executing the activation (making the update software active), the update software can be activated by switching the storage area from which the program is read by the CPU 51 of the ECU 50b.

As a specific example, it is assumed that the current software is stored in the storage area 56a of the non-volatile memory 53b, which is a dual-bank memory, and the update software is installed on the storage area 56b. Upon receiving an instruction on activating the update software from the OTA master 30, the ECU 50b can switch the storage area (the active bank) to be read of the CPU 51 by switching, for example, a read start address of the CPU 51 from a head address of the storage area 56a to a head address of the storage area 56b, and can execute the update software installed in the storage area 56b. In the present disclosure, a configuration of the non-volatile memory, referred to as a "single-bank suspension memory" in which one storage area is pseudo-divided into two sides, and a program can be written on the one side while the program stored on the other side is being executed, is also classified into the second-type memory.

FIG. 7 illustrates an example of type information, which is the information on the types of the non-volatile memories mounted on the ECUs 50a to 50d, respectively. In the type information exemplified in FIG. 7, an ECU_ID, which is a number used for identifying the ECU, is associated with the type (the first type (the single-bank)/the second type (the dual-bank)) of the non-volatile memory mounted on the ECU. The type information is stored in at least the storage unit 16 of the center 10, and managed. The type information may be generated in advance based on specifications of the ECUs 50a to 50d composing the in-vehicle network 90 and stored in, for example, the storage unit 16 at the time of manufacturing and the like of the vehicle. Alternatively, the type information may be acquired by communication inside the in-vehicle network 90 from the target ECU at the time of executing the software update processing.

The display device 70 is a human-machine interface (HMI) used for executing various displays, such as a display representing that there is the update data at the time of executing the software update processing of the ECUs 50a to 50d, a display of an approval request screen for requesting approval for the software update from a user or a manager of the vehicle, and a display of a result or a state of the software update. As the display device 70, a display device of a car navigation system can be typically used, but the display device 70 is not particularly limited as long as it can display information required at the time of executing the software update processing. In addition to the display device 70, an ECU and the like may be further connected to the bus 60*d* illustrated in FIG. 1.

The communication module 80 is a unit having a function of controlling communication between the center 10 and the vehicle, and is a communication device used for connecting the in-vehicle network 90 to the center 10. The communication module 80 is wirelessly connected to the center 10 by way of the network 100 such that the OTA master 30 executes vehicle authentication, downloading of the update data, or the like. Further, the communication module 80 can be wirelessly connected to the information terminal 95 without going through the network 100. For the wireless connection with the information terminal 95, a near-field wireless communication method, such as Bluetooth® or RF/LF communication, can be used. The communication module 80 may be included in the OTA master 30.

Overview of Software Update Processing

At, for example, the time of the power supply ON in the vehicle, the OTA master 30 transmits the update confirmation request of the software to the center 10. The update confirmation request includes a vehicle ID for identifying the vehicle and vehicle configuration information, which is information on a state of an ECU (a system configuration), such as current versions of hardware and the software of the ECUs 50*a* to 50*d* connected to the in-vehicle network 90. The vehicle configuration information can be generated by acquiring identification numbers (ECU_ID) of the ECUs and identification numbers of the software versions (ECU_Software_ID) of the ECUs from the ECUs 50*a* to 50*d* connected to the in-vehicle network 90. The vehicle ID and the current versions of the software of the ECUs 50*a* to 50*d* are used for determining whether there is the update data of the software of the ECUs 50*a* to 50*d* by comparing them with the latest software version held by the center 10 for each vehicle ID. As a response to the update confirmation request received from the OTA master 30, the center 10 transmits a notification indicating whether there is the update data to the OTA master 30 and/or the information terminal 95. When there is the update data of the software of the ECUs 50*a* to 50*d*, the OTA master 30 transmits, to the center 10, the download request for the distribution package. The center 10 transmits, to the OTA master 30, the distribution package including the update data and the like according to the download request received from the OTA center 30. In addition to the update data, the distribution package may include verification data for verifying the authenticity of the update data, the number of pieces of the update data, type information, various pieces of control information used at the time of executing the software update, or the like.

The OTA master 30 determines whether there is the update data of the software of the ECUs 50*a* to 50*d* based on the response, received from the center 10, to the update confirmation request. Further, the OTA master 30 verifies the authenticity of the distribution package received from the center 10 and stored in the storage device 13. Further, the OTA master 30 transfers the update data downloaded in the distribution package to the target ECU and causes the target ECU to install the update data. After the completion of the installation, the OTA master 30 gives the target ECU an instruction on the activation for making the installed updated version software active.

Further, in approval request processing, the center 10 causes an output device to output a notification indicating that the approval for the software update is required or a notification prompting an input indicating that the software update has been approved. As the output device, a display device 70 provided on the in-vehicle network 90, the information terminal 95, or the like, can be used. For example, in the approval request processing, when the display device 70 is used as the output device, the OTA master 30 can cause the display device 70 to display an approval request screen used for requesting the approval for the software update from the user or the manager, or can cause the display device 70 to display a notification prompting a specific input operation, such as pressing of an approval button in the case where the user or the manager approves the request. In the approval request processing, when the information terminal 95 is used as the output device, the OTA master 30 can cause the information terminal 95 to display, on its display screen, the approval request for requesting approval for the software update from the user or the manager, or a notification prompting a specific input operation, such as pressing of an approval button in the case where the user or the manager approves the request. Alternatively, in the approval request processing, the center 10 can cause the display device 70 or the information terminal 95 to display text, an icon, or the like, notifying that there is the update data of the software of the ECUs 50*a* to 50*d*, or cause the display device 70 or the information terminal 95 to display a restriction and the like during the execution of the software update processing. Upon receiving the input indicating that the request has been approved from the user or the manager via the OTA master 30 and/or the information terminal 95, the center 10 gives an instruction on executing control processing for the above-described installation and activation to the OTA master 30, and updates the software of the target ECU.

Here, when the non-volatile memory of the target ECU is the single-bank memory having one storage area used for storing data, such as software, in principle, the approval request processing for the software update is executed before the execution of the installation because the installation and the activation are consecutively executed. Even for the target ECU of the single-bank memory, depending on information on an update sequence instructed from the center 10, it can be required that the update processing be temporarily stopped in a state where the installation has been completed, that is, the activation be suspended (on standby). Further, when the non-volatile memory of the target ECU is the dual-bank memory having two storage areas used for storing data, such as software, the approval request processing for the software update is executed at least after the execution of the installation and before the execution of the activation. When the non-volatile memory of the target ECU is the dual-bank memory, the approval request processing for the software update before the execution of the installation may be executed or omitted.

The software update processing is composed of a phase in which the OTA master 30 downloads the update data from the center 10 (a download phase), a phase in which the OTA master 30 transfers the downloaded update data to the target ECU, and installs the update software on the storage area of the target ECU based on the update data (an installation phase), and a phase in which the target ECU makes the installed update software active (an activation phase).

The download is processing in which the OTA master 30 receives, from the center 10, the update data for updating the software of the ECU transmitted in the distribution package and stores it in the storage unit 37. Regarding reception of the update data by downloading, the download phase includes not only the execution of the download, but also controls of a series of processes on the download, such as determining whether the download can be executed and verifying the update data.

The update data transmitted from the center 10 to the OTA master 30 may include any of the update software of the ECU (total data or difference data), the compressed data obtained by compressing the update software, and the divided data obtained by dividing the update software or the compressed data. Further, the update data may include the ECU_ID of the target ECU (or a serial number) and an ECU_Software_ID of the target ECU before the update. The update data is downloaded as the above-described distribution package, but the distribution package includes the update data for a single ECU or the plurality of ECUs.

The installation is processing in which the OTA master 30 writes the update software (the updated version program) on the non-volatile memories of target ECUs, based on the update data downloaded from the center 10. The installation phase of the present embodiment includes not only the execution of the installation, but also controls of a series of processes on the installation, such as determining whether the installation can be executed, transferring the update data, and verifying the update software.

When the update data includes the update software itself (the total data), in the installation phase, the OTA master 30 transfers the update data (the update software) to the target ECU. Further, when the update data includes the compressed data of the update software, difference data of the update software, or divided data of the update software, the OTA master 30 may transfer the update data to the target ECU and the target ECU may generate the update software from the update data, or the OTA master 30 may generate the update software from the update data and then transfer the update software to the target ECU. Here, the update software can be generated by decompressing the compressed data or assembling (integrating) the difference data or the divided data.

The update software can be installed by the target ECU based on a request for the installation from the OTA master 30 following a restriction (described below) on the update based on the cooperation state between the vehicle and the information terminal 95 received from the center 10. A specific target ECU that has received the update data may autonomously execute the installation without receiving an explicit instruction from the OTA master 30.

The activation is processing in which the target ECU makes (activates) the update software installed on its non-volatile memory active. The activation phase includes not only the execution of the activation but also controls of a series of processes on the activation, such as determining whether the activation can be executed, the approval request for the activation to the user or the manager of the vehicle, and verifying the execution result.

The update software can be activated by the target ECU based on a request for the activation from the OTA master 30 following the restriction (described below) on the update based on the cooperation state between the vehicle and the information terminal 95 received from the center 10. A specific target ECU that has received the update data may autonomously execute the activation after the completion of the installation without receiving an explicit instruction from the OTA master 30.

The software update processing can be executed continuously or in parallel to each of the target ECUs.

Further, the "software update processing" in the present specification includes not only processing for continuously executing all of the download, installation, and activation, but also processing for executing only a part of the download, installation, and activation.

Processing

Next, specific examples of the software update processing executed in the network system according to the present embodiment will be described with further reference to FIGS. 8A, 8B, 9A, and 9B.

(1) Specific Example 1

Figure 8A:
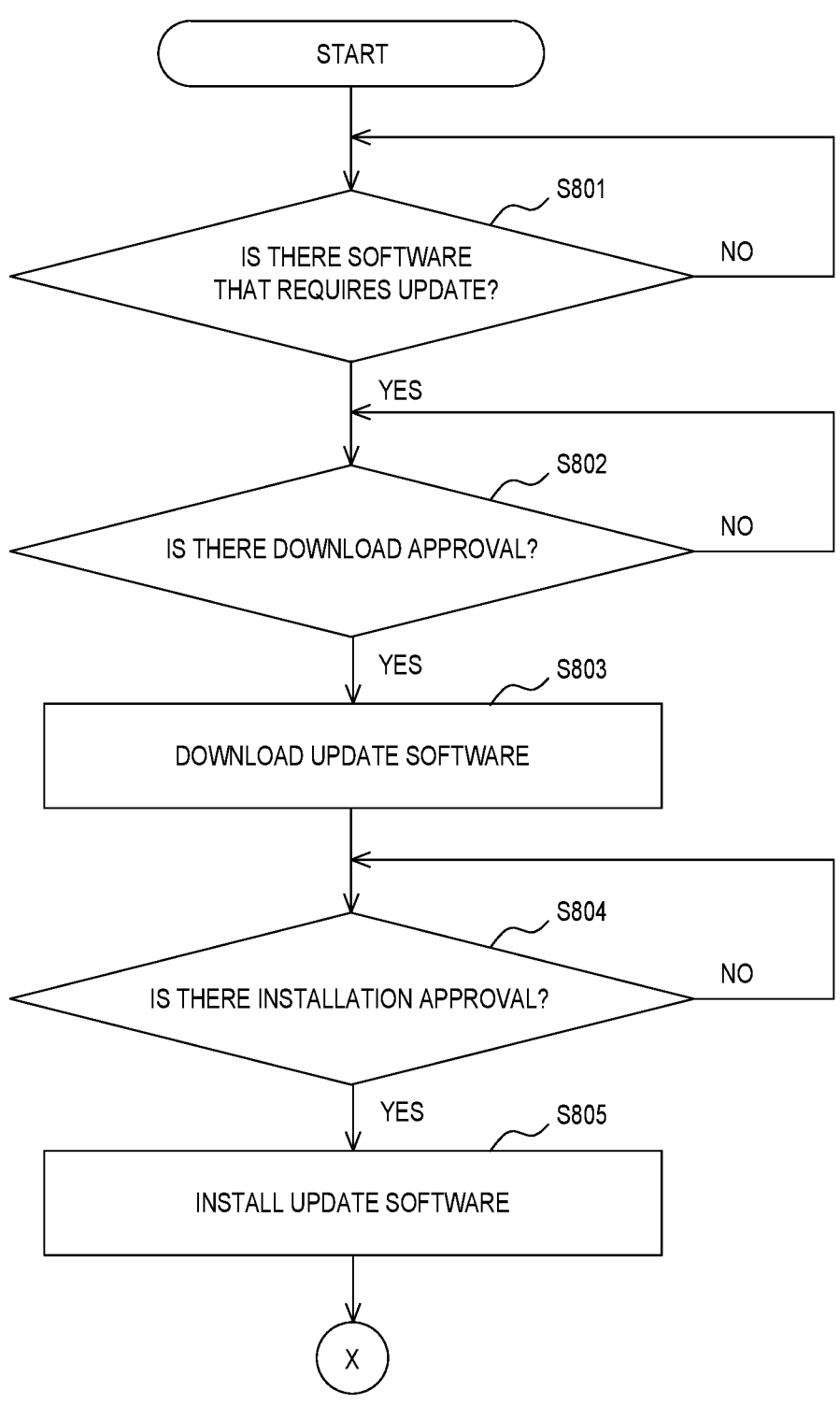
FIG. 8A is a flowchart of software update processing according to a specific example 1 executed by the center.
Figure 8B:
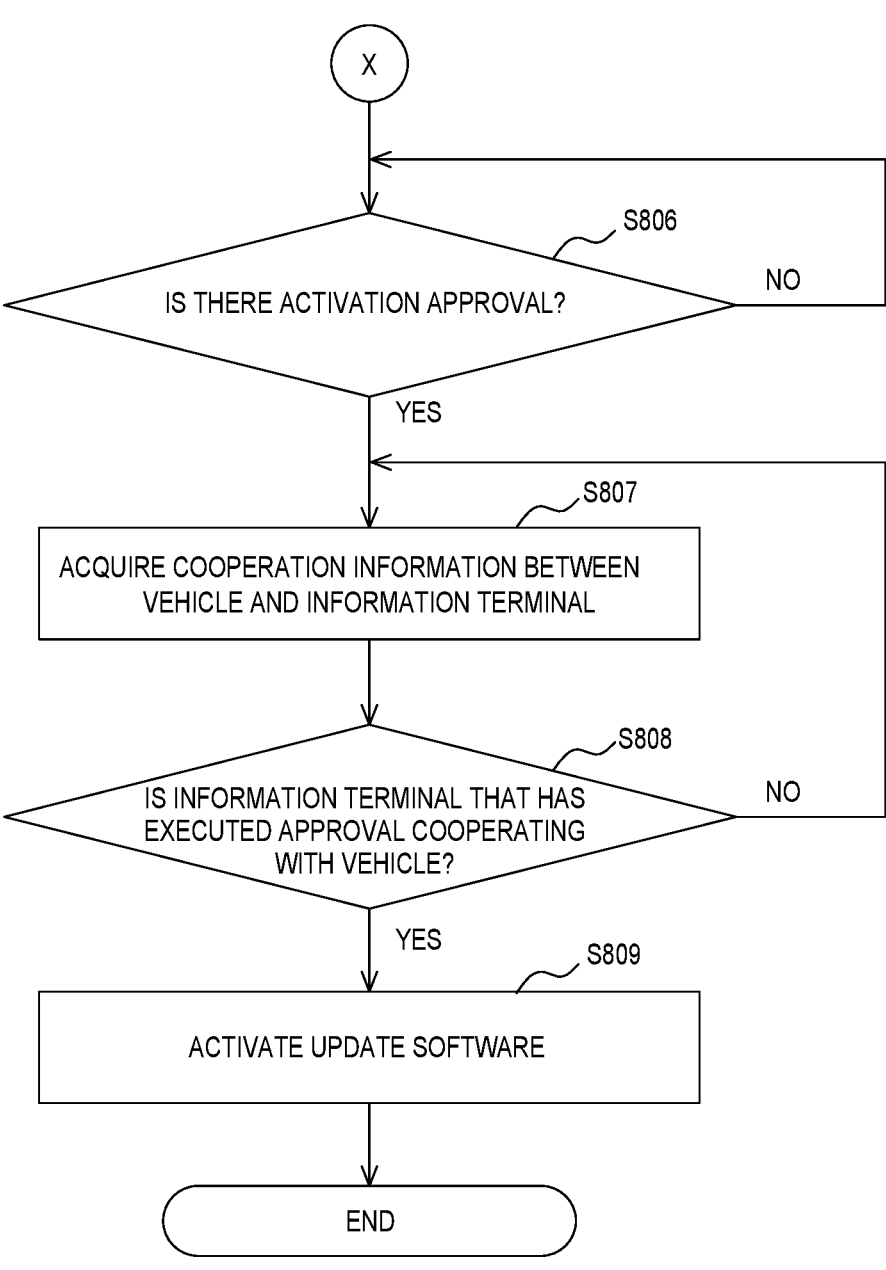
FIG. 8B is another flowchart of the software update processing according to the specific example 1 executed by the center.

FIGS. 8A and 8B are flowcharts describing software update processing procedures according to a specific example 1 executed by the center 10. The processes of FIG. 8A and those of FIG. 8B are connected by a combiner X. The software update processing according to the specific example 1 is an example where the center 10 executes the software update processing for the vehicle according to the update approval by the information terminal 95 when the target ECU implementing software that requires an update has the dual-bank memory mounted thereon.

(Step S801) The center 10 determines whether there is software that requires an update in a target vehicle. This determination can be made based on, for example, the current version of a piece of software of each ECU 50*a* to 50*d* mounted on the vehicle, acquired from the vehicle configuration information that is included in the update confirmation request transmitted from the OTA master 30, and the latest version of each piece of software stored in the storage unit 16 of the center 10. The process proceeds to step S802 only when there is software that requires an update in the target vehicle (step S801, YES).

(Step S802) The center 10 determines whether the download of the update software (the software based on the update data) has been approved by the information terminal 95. The center 10 can make this determination by, for example, receiving, from the information terminal 95, a response (an update approval notification and the like) to a download approval request transmitted by the center 10 to the information terminal 95. The process proceeds to step S803 only when the download of the update software has been approved by the information terminal 95 (step S802, YES).

(Step S803) The center 10 transmits the update software to the OTA master 30 to cause the OTA master 30 to download the update software. A predetermined distribution package can be used for transmitting the update software. When the download of the update software by the OTA master 30 is completed, the process proceeds to step S804.

(Step S804) The center 10 determines whether the installation of the update software has been approved by the information terminal 95. The center 10 can make this determination by, for example, receiving, from the information terminal 95, a response (an update approval notification and the like) to an installation approval request transmitted by the center 10 to the information terminal 95. The process proceeds to step S805 only when the installation of the update software has been approved by the information terminal 95 (step S804, YES).

(Step S805) The center 10 causes the OTA master 30 and the target ECU to execute the installation, which is processing for transferring the update software downloaded by the OTA master 30 to the target ECU and writing the update software thereon. When the installation of the update software on the target ECU is completed, the process proceeds to step S806.

(Step S806) The center 10 determines whether the activation of the update software has been approved by the information terminal 95. The center 10 can make this determination by, for example, receiving, from the information terminal 95, a response (an update approval notification and the like) to an activation approval request transmitted by the center 10 to the information terminal 95. The process proceeds to step S807 only when the activation of the update software has been approved by the information terminal 95 (step S806, YES).

(Step S807) The center 10 acquires the cooperation information indicating the cooperation state between the vehicle and the information terminal 95. Examples of the cooperation information include "cooperation OK", which is used when the vehicle is connected to the information terminal 95 by the near-field wireless communication, and "cooperation NG", which is used when the vehicle is not connected to the information terminal 95 by the near-field wireless communication. The cooperation information is basically acquired from the vehicle (the OTA master 30), but may be able to be acquired from the information terminal 95. When the cooperation information between the vehicle and the information terminal 95 is acquired, the process proceeds to step S808.

(Step S808) The center 10 determines whether the vehicle is cooperating with the information terminal 95 based on the cooperation information acquired in step S807. The information terminal 95, which is a target of the determination, is the information terminal 95 that has approved the activation. When the center 10 determines that the information terminal 95 that has approved the activation is cooperating with the vehicle (step S808, YES), the process proceeds to step S809, and when the center 10 determines that the information terminal 95 that has approved the activation is not cooperating with the vehicle and communication with the vehicle is being interrupted (step S808, NO), the process proceeds to step S807.

(Step S809) The center 10 permits the activation, which is the processing for making the update software installed on the target ECU active, and causes the OTA master 30 and the target ECU to execute the activation. When the activation of the update software on the target ECU is completed, this software update processing ends.

(2) Specific Example 2

Figure 9A:
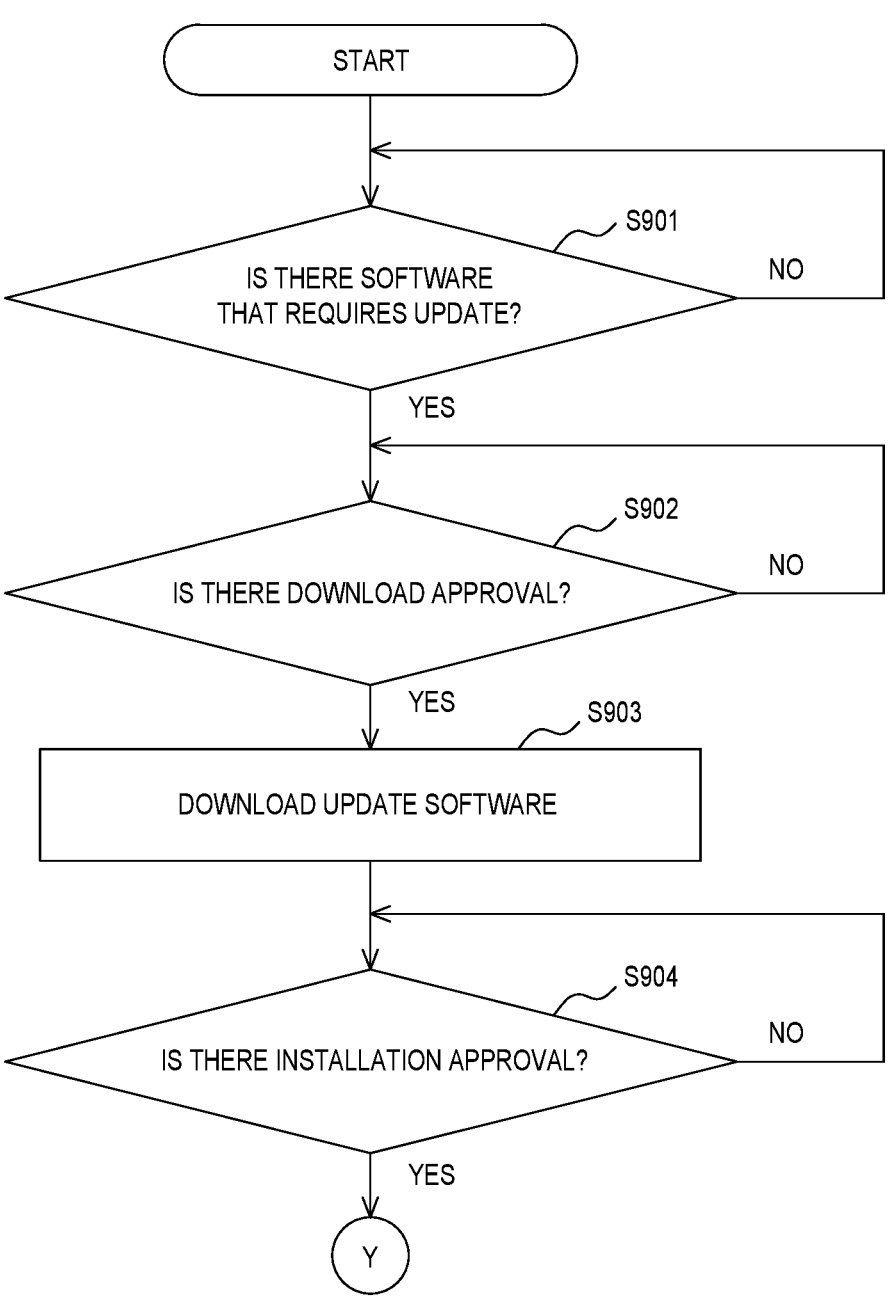
FIG. 9A is a flowchart of software update processing according to a specific example 2 executed by the center.
Figure 9B:
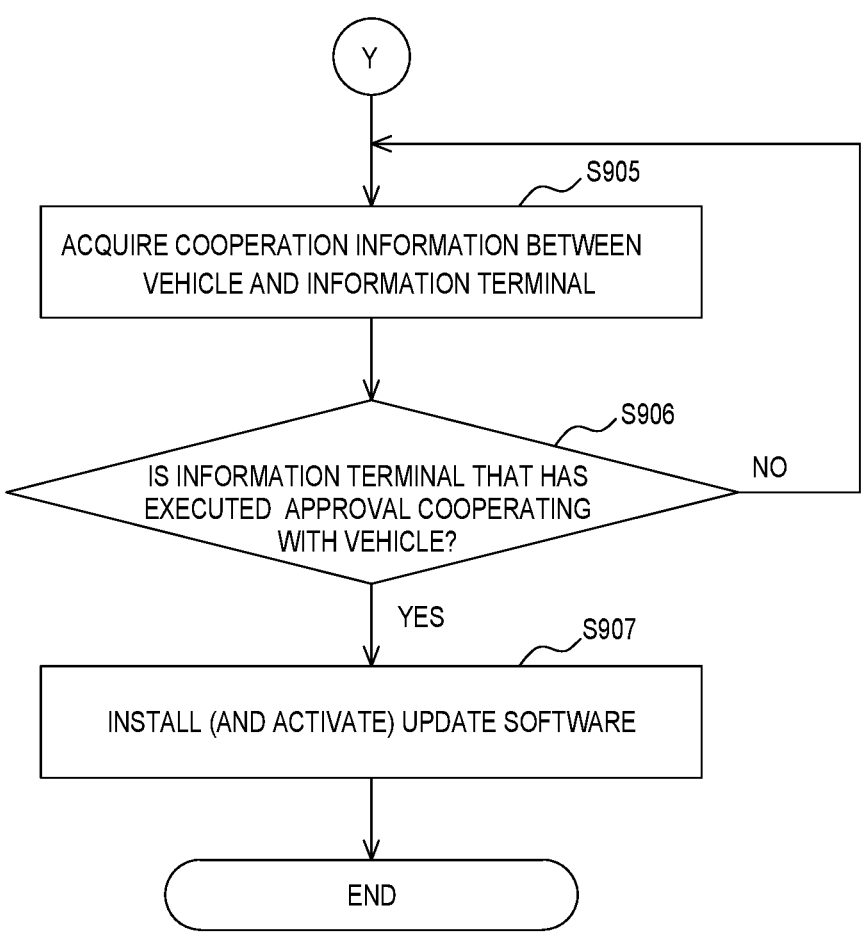
FIG. 9B is another flowchart of the software update processing according to the specific example 2 executed by the center.

FIGS. 9A and 9B are flowcharts describing software update processing procedures according to a specific example 2 executed by the center 10. The processes of FIG. 9A and those of FIG. 9B are connected by a combiner Y. The software update processing according to the specific example 2 is an example where the center 10 executes the software update processing for the vehicle according to the update approval by the information terminal 95 when the target ECU implementing software that requires an update has the single-bank memory mounted thereon.

(Step S901) The center 10 determines whether there is software that requires an update in the target vehicle. This determination can be made based on, for example, the current version of a piece of software of each ECU 50a to 50d mounted on the vehicle, acquired from the vehicle configuration information that is included in the update confirmation request transmitted from the OTA master 30, and the latest version of each piece of software stored in the storage unit 16 of the center 10. The process proceeds to step S902 only when there is software that requires an update in the target vehicle (step S901, YES).

(Step S902) The center 10 determines whether the download of the update software (the software based on the update data) has been approved by the information terminal 95. The center 10 can make this determination by, for example, receiving, from the information terminal 95, a response (an update approval notification and the like) to a download approval request transmitted by the center 10 to the information terminal 95. The process proceeds to step S903 only when the download of the update software has been approved by the information terminal 95 (step S902, YES).

(Step S903) The center 10 transmits the update software to the OTA master 30 and causes the OTA master 30 to download the update software. A predetermined distribution package can be used for transmitting the update software. When the OTA master 30 completes the download of the update software, the process proceeds to step S904.

(Step S904) The center 10 determines whether the installation of the update software has been approved by the information terminal 95. The center 10 can make this determination by, for example, receiving, from the information terminal 95, a response (an update approval notification and the like) to an installation approval request transmitted by the center 10 to the information terminal 95. The process proceeds to step S905 only when the installation of the update software has been approved by the information terminal 95 (step S904, YES).

(Step S905) The center 10 acquires the cooperation information indicating the cooperation state between the vehicle and the information terminal 95. Examples of the cooperation information include "cooperation OK", which is used when the vehicle is connected to the information terminal 95 by the near-field wireless communication, and "cooperation NG", which is used when the vehicle is not connected to the information terminal 95 by the near-field wireless communication. The cooperation information is basically acquired from the vehicle (the OTA master 30), but may be able to be acquired from the information terminal 95. When the cooperation information between the vehicle and the information terminal 95 is acquired, the process proceeds to step S906.

(Step S906) The center 10 determines whether the vehicle is cooperating with the information terminal 95 based on the cooperation information acquired in step S905. The information terminal 95, which is a target of the determination, is the information terminal 95 that has approved the installation. When the center 10 determines that the information terminal 95 that has approved the installation is cooperating with the vehicle (step S906, YES), the process proceeds to step S907, and when the center 10 determines that the information terminal 95 that has approved the installation is not cooperating with the vehicle and communication with the vehicle is being interrupted (step S906, NO), the process proceeds to step S905.

(Step S907) The center 10 permits the installation, which is the processing for transferring the update software downloaded by the OTA master 30 to the target ECU and writing the update software thereon, and causes the OTA master 30 and the target ECU to execute the installation. Further, the center 10 causes the OTA master 30 and the target ECU to execute the activation, which is processing for making the update software installed on the target ECU active. When the installation and the activation of the update software on the target ECU are completed, this software update processing ends.

The above-described specific examples 1 and 2 describe examples where, when the information terminal 95 that has approved the installation or the activation is not cooperating with the vehicle and the communication with the vehicle is being interrupted before the installation or the activation processing, the processing for installing and activating the update software is waited until the cooperation between the information terminal 95 and the vehicle is recovered (restoration of the communication state) and executed (permitted) thereafter. However, when the information terminal 95 is not cooperating with the vehicle and the communication with the vehicle is being interrupted before the installation or the activation processing, the update processing may be immediately stopped without waiting for the subsequent cooperation recovery (the restoration of the communication state) (that is, the software update processing ends with "No" in step S808 of FIG. 8B, and the software update processing ends with "No" in step S906 of FIG. 9B).

ACTION AND ADVANTAGEOUS EFFECT

As above, with the network system according to one embodiment of the present disclosure, when the software update for the target ECU mounted on the vehicle has been approved by the information terminal 95, the center 10 adds a restriction required for the software update processing further based on the cooperation state between the information terminal 95 and the vehicle. More specifically, when the non-volatile memory of the target ECU is the dual-bank memory, the activation for making the update software installed on the target ECU active and the processing thereafter are not permitted even when the software update has been approved. Further, when the non-volatile memory of the target ECU is the single-bank memory, the installation for writing the update software on the target ECU and the processing thereafter are not permitted even when the software update has been approved.

By this restriction processing, for example, when execution of the approval processing is required via the information terminal 95 associated with the vehicle due to, for example, a vehicle that does not have a function through which it is possible to present information on software update by an OTA, the update processing can be permitted only when the information terminal 95 that has approved the software update is in the vicinity of the vehicle. Therefore, it is possible to complete the software update safely and in a short time.

Further, with the network system according to the present embodiment, when the non-volatile memory of the target ECU is the dual-bank memory, the update processing until the installation is advanced, the cooperation between the information terminal 95 and the vehicle is recovered, and the activation and the processing thereafter can be executed thereafter. When the non-volatile memory of the target ECU is the single-bank memory, the update processing until the download is advanced, the cooperation between the information terminal 95 and the vehicle is recovered, and the installation and the processing thereafter can be executed thereafter. As such, it is possible to appropriately control software update processing of an ECU mounted on a vehicle.

In the above embodiment, a restriction on the software update processing is executed based only on the cooperation state between the vehicle and the information terminal 95, but it may be executed in combination with a traveling state of the vehicle. For example, when the communication between the vehicle and the information terminal 95 is being interrupted and the vehicle is traveling, the restriction on the software update processing can be executed.

Further, in the above embodiment, an example is described where, when the communication between the vehicle and the information terminal 95 is being interrupted but is restored thereafter, the restriction on the software update processing is released. However, the software update processing may be stopped without being released.

The technology of the present disclosure can be used in a network system used for updating software of an ECU mounted on a vehicle.

What is claimed is:
1. A center comprising:
at least one processor configured to:
execute communication with a vehicle and a smartphone owned by a user of the vehicle;
permit software update processing of an electronic control unit mounted on the vehicle based on a notification of an approval by a user of the vehicle, the notification being received from the smartphone;
download the software update after permitting the software update processing;
acquire a communication state between the vehicle and the smartphone after downloading the software update;
restrict the software update processing executed by the communication between the vehicle and the center when determining that the communication between the vehicle and the smartphone is being interrupted based upon the communication state acquired after permitting the software update processing; and
notify a software update state to the smartphone.
2. The center according to claim 1, wherein
a non-volatile memory having two storage areas is mounted on the electronic control unit, and
the at least one processor is configured to, in the software update processing of the electronic control unit, not permit activation in which update software written on the storage areas is made active and processing after the activation when the at least one processor receives the notification and the communication between the vehicle and the smartphone is being interrupted.
3. The center according to claim 1, wherein
a non-volatile memory having one storage area is mounted on the electronic control unit, and
the at least one processor is configured to, in the software update processing of the electronic control unit, not permit installation in which update software is written on the storage area and processing after the installation when the at least one processor receives the notification and the communication between the vehicle and the smartphone is being interrupted.
4. The center according to claim 2, wherein the at least one processor is configured to, when determining that the communication between the vehicle and the smartphone is restored, permit the activation and the software update processing after the activation.
5. The center according to claim 3, wherein the at least one processor is configured to, when determining that the communication between the vehicle and the smartphone is restored, permit the installation and the software update processing after the installation.
6. The center according to claim 1, wherein the at least one processor is further configured to
acquire a cooperation state between the vehicle and the smartphone from the vehicle,
determine whether the vehicle is connected to the smartphone based on the cooperation state during the software update processing, and notify the software update state to the smartphone when the at least one processor determines that the vehicle is connected to the smartphone during the software update processing.

7. A method executed by a center including at least one processor and at least one memory, the method comprising:

executing communication with a vehicle and a smartphone owned by a user of the vehicle;

permitting software update processing of an electronic control unit mounted on the vehicle based on a notification of an approval by as user of the vehicle, the notification being received from the smartphone;

downloading the software update after permitting the software update processing;

acquiring a communication state between the vehicle and the smartphone after downloading the software update;

restricting the software update processing executed by the communication between the vehicle and the center when determining that the communication between the vehicle and the smartphone is being interrupted based upon the communication state acquired after permitting the software update processing; and notifying a software update state to the smartphone.

8. A non-transitory storage medium storing instructions that are executable by a computer of a center which includes at least one processor and at least one memory, and that cause the computer to execute functions comprising:

executing communication with a vehicle and a smartphone owned by a user of the vehicle;

permitting software update processing of an electronic control unit mounted on the vehicle based on a notification of an approval by as user of the vehicle, the notification being received from the smartphone;

downloading the software update after permitting the software update processing;

acquiring a communication state between the vehicle and the smartphone after downloading the software update;

restricting the software update processing executed by the communication between the vehicle and the center when determining that the communication between the vehicle and the smartphone is being interrupted based upon the communication state acquired after permitting the software update processing; and notifying a software update state to the smartphone.

* * * * *